United States Patent [19]

Fang et al.

[11] Patent Number: 4,892,795

[45] Date of Patent: Jan. 9, 1990

[54] NON-AQUEOUS CELL COMPRISING NIOBIUM TRISELENIDE

[75] Inventors: Wei-Chou Fang, Bridgewater; Brijesh Vyas, Warren, both of N.J.

[73] Assignee: American Telephone and Telegraph Company, AT&T Bell Laboratories, Murray Hill, N.J.

[21] Appl. No.: 244,218

[22] Filed: Sep. 14, 1988

[51] Int. Cl.$^4$ .................... H01M 4/58; H01M 6/00
[52] U.S. Cl. ...................... 429/194; 429/218; 423/509; 423/62; 29/623.5
[58] Field of Search .............. 429/194, 218; 29/623.5; 423/509, 62; 427/126.1

[56] References Cited

U.S. PATENT DOCUMENTS

| | | | |
|---|---|---|---|
| 3,864,167 | 2/1975 | Broadhead et al. | 429/218 |
| 4,035,555 | 7/1977 | Murphy et al. | 429/194 |
| 4,117,209 | 9/1978 | Markin et al. | 429/104 |
| 4,160,069 | 7/1979 | Johnson et al. | 429/163 X |
| 4,452,777 | 6/1984 | Abraham et al. | 429/104 |
| 4,740,433 | 4/1988 | Lu | 429/94 |
| 4,753,859 | 6/1988 | Brand et al. | 429/197 |

OTHER PUBLICATIONS

*High-Energy Batteries,* Plenum Press, New York, 1967, by Raymond Jasinski, pp. 140–144.

*Primary Examiner*—Stephen J. Kalafut
*Attorney, Agent, or Firm*—Walter G. Nilsen

[57] ABSTRACT

A process of making a lithium cell with a positive electrode that comprises a niobium chalcogenide (e.g., $NbSe_3$) active material. The process comprises forming the active material by a procedure that comprises forming a layer of Nb powder on an inert substrate (e.g., an alumina plate), and reacting the powder with selenium or sulfur vapor such that the desired (fibrous) chalcogenide is formed. The powder layer typically is formed by depositing (e.g., by spraying) a layer of slurry on the substrate, with the slurry comprising a liquid such as propylene glycol and Nb powder, and removing the liquid from the deposited slurry. The resulting layer of Nb powder can be of uniform thickness, advantageously is less than 0.1 mm thick, and adheres relatively well to the substrate. In preferred embodiments reacting the Nb powder with Se vapor comprises a two-stage heat treatment, the first stage comprising maintaining the powder in contact with Se vapor for at least four hours at a temperature in the range 520°–625° C., and the second stage for at least two hours at a temperature in the range 625°–780° C.

14 Claims, 1 Drawing Sheet

NON-AQUEOUS CELL COMPRISING NIOBIUM TRISELENIDE

TECHNICAL FIELD

The invention is a nonaqeuous cell in which the active material in the positive electrode comprises niobium triselenide.

BACKGROUND OF THE INVENTION

There has been considerable interest in recent years in non-aqueous batteries. An attractive feature of these batteries is their potentially high voltage and high energy densities. Particularly attractive are non-aqueous batteries using lithium negative electrodes since lithium has high standard potential and low density, so that such electrodes can have exceptionally high energy densities (see for example, *High Energy Batteries* by R. Janinski, Plenum Press, New York, 1967, pp. 140–144). Similar statements can be made for other Group I and Group II elements such as sodium, potassium and magnesium.

Exceptionally good active materials for the positive electrode of lithium non-aqueous batteries are niobium chalcogenides such as niobium triselenide and niobium trisulfide (see for example, U.S. Pat. No. 3,864,167 issued on Feb. 4, 1975 to J. Broadhead et al, incorporated herein by reference). These electrode materials not only have high energy density, good charge and discharge characteristics (cycle performance) and good stability, but also are relatively available and compatible with a large variety of electrolyte systems. Tests carried out on lithium cells made with these positive electrode materials (especially with niobium triselenide) confirm the advantages outlined above.

Electrodes comprising $NbSe_3$ can be fabricated by providing a thin Nb foil and reacting it with Se vapor. The resulting fibrous sheet of $NbSe_3$ is then rolled onto a metal grid that serves as current collector. $NbS_3$ containing electrodes can be similarly produced. The above process has several shortcomings, including relatively high materials cost, and relatively long reaction time. Furthermore, it is generally difficult to produce thin sheets of active material of uniform thickness by means of the prior art technique.

In order to increase the commercial value of using chalcogenides such as $NbSe_3$ as the active positive electrode material in non-aqueous cells, it is desirable to reduce the cost of fabricating cells with chalcogenide active material and to make the fabrication procedure more easily adaptable to mass production. In particular, it is desirable to find a synthesis procedure for $NbSe_3$ (and $NbS_3$) active electrode material that is less expensive, that can be used to produce thin sheets of active material of uniform thickness, and that is less cumbersome and/or more easily adapted to mass production under manufacturing conditions than those known to the prior art. This application discloses such a procedure.

SUMMARY OF THE INVENTION

The invention is a procedure for making a non-aqueous cell comprising chalcogenide active material, typically niobium triselenide and niobium trisulfide, in which the active material is made by a procedure that comprises forming a layer of Nb powder on a substrate, and reacting the powder with chalcogenide vapor under conditions such that the desired niobium chalcogenide is formed. Typically the procedure comprises deposition of a slurry comprising niobium powder onto a substrate, removal of the liquid in the slurry, followed by reaction of the niobium powder with selenium or sulfur vapor. The reaction is conveniently done on an inert substrate such as alumina or quartz or on a relatively inert metal foil or grid (e.g., aluminum), with alumina substrate being currently preferred.

A significant aspect of the novel procedure is the deposition of the niobium powder using a slurry, exemplarily a slurry containing about 50 weight percent niobium powder, with the particle size of the niobium powder being less than about 325 mesh. The procedure can yield an adherent layer of niobium powder which can be readily reacted to yield as fibrous niobium chalcogenide mat or sheet.

Without intending to imply thereby any limitation, the subsequent discussion will, for the sake of ease of exposition, be generally in terms of a specific niobium chalcogenide, namely, $NbSe_3$. Similar process conditions are applicable for the production of $NbS_3$, although minor experimentation may be required to establish optimal process parameters.

In currently preferred embodiments of the invention the slurry is stirred and circulated during deposition to assure uniformity and the liquid is removed from the slurry layer by heating, although other removal modes are also contemplated (e.g., vacuum drying). Subsequent to drying the niobium powder is reacted with selenium, generally by heating in the temperature range from about 625° C. to about 780° C. Currently preferred is a two stage heating process, exemplarily comprising heating to about 580° C. for about 12 hours, followed by heating to about 680° C. for about 15 hours. Reaction generally takes place in a closed reaction vessel such as a quartz tube. Niobium triselenide made by this procedure has excellent characteristics for battery applications, including high energy density, good cycle performance and good stability under cell conditions.

After reaction, the $NbSe_3$ sheet may be removed from the inert substrate and, if desired, rolled onto a metal mesh (e.g., a nickel mesh) and shaped for use in a cylindrical lithium cell. Such a procedure is easily carried out, adaptable to mass production and yields niobium triselenide material which exhibits excellent electrode characteristics.

BRIEF DESCRIPTION OF THE DRAWING

The FIGURE shows a schematic diagram of relevant parts of an exemplary rolled nonaqueous cylindrical cell made in accordance with the invention.

DETAILED DESCRIPTION

Figure 1:
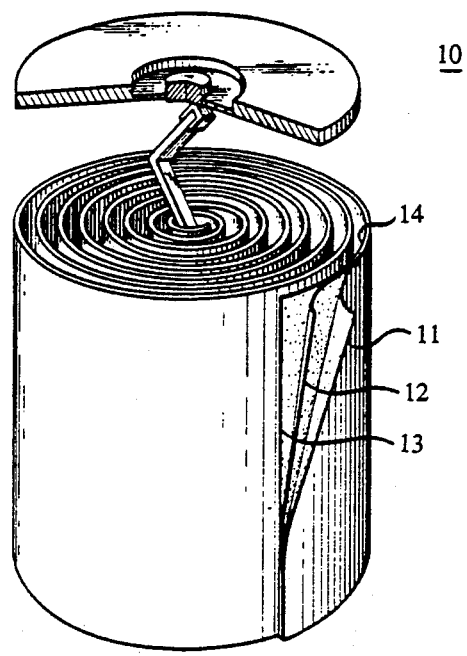

The invention is based on the discovery that $NbSe_3$ (or $NbS_3$) with morphology and properties suitable for use in non-aqueous lithium cells can be synthesized by a process that comprises reacting niobium powder with selenium (or sulfur) vapor in a suitable temperature range. Advantageously this is done by forming a layer of niobium powder on a suitable substrate by a special procedure involving depositing a liquid suspension of niobium powder on the substrate, removing the liquid from the layer, and reacting the powder with the vapor.

Particularly important is the procedure for depositing the niobium powder on the substrate before reaction with the vapor. This procedure involves providing a slurry of niobium in an inert liquid (e.g., propylene glycol), depositing the slurry on a substrate (e.g., by spraying) and removing the liquid (usually by heating of the substrate with the slurry layer thereon). A distinct advantage of this procedure is the uniformity of the resulting niobium powder layer, and the relatively good adherence of the powder layer to the substrate. The former obviously is a desirable characteristic since it can result in a more uniform final product, and the latter because it makes handling during manufacture easier.

The slurry composition may vary over large limits. The liquid should be chemically inert to the niobium powder and the substrate, with reasonable viscosity so the suspension does not separate too fast, and should have a reasonable boiling temperature (e.g., below about 200° C.) to facilitate removal. Propylene glycol is quite suitable and is currently preferred, but other liquids (e.g., glycerol, low boiling point oils) can also be used. Those skilled in the art will undoubtedly be able to identify still other suitable liquids, should the need arise. The concentration of niobium powder in the slurry can vary over large limits, typically from 10 to 90 weight percent niobium, with 30 to 70 weight percent preferred. Although the particle size of the niobium powder may vary over large limits, mesh size less than 325 is currently preferred (i.e., all particles are able to pass through a 325 mesh screen). Even smaller particle size is advantageous because it may result in better adherence of the powder to the substrate and more rapid reaction of the niobium with the selenium.

A typical procedure for depositing the powder on the substrate is as follows: the slurry (50 weight percent Nb) is sprayed onto a substrate (e.g., an alumina plate) by means of a conventional spray gun that comprises means for continuously stirring and circulating the slurry, (exemplarily comprising a peristaltic pump) and the liquid is removed from the slurry layer by evaporation (heating in an oven to about 150° C. for about one hour). Typically the slurry layer is relatively thin, of order 0.1 mm or less.

Next, the niobium powder is reacted with selenium. This is generally done in a closed container, for example a sealed quartz tube. Generally, reacting the powdered niobium with selenium involves heating to a temperature in the range from 625° C. to 780° C. Below 625° C., typically a compound different from $NbSe_3$ forms (believed to be $Nb_2Se_9$), and above 780° C. typically still another compound forms (believed to be $NbSe_2$). The currently preferred temperature range for the reaction is 670° C. to 720° C., with about 690°±10° C. most preferred. Preferred heating times are from two hours to five days.

Advantageous results have been obtained by a two-stage heating process. In the first stage, the niobium and selenium exemplarily are heated to a temperature between 520° C. and 625° C. for at least four hours (eight hours are currently preferred, with a temperature between 570° C. and 610° C. for 12 hours being most preferred). Longer times than about one day are not detrimental but are generally undesirable for economic reasons.

In the second heating stage, the sample is heated to a temperature in the range 625° C. to 780° C. (650° C. to 700° C. currently preferred) for between 2 hours and 5 days. Reaction times between 10 and 20 hours are currently preferred. Reaction times substantially shorter than 2 hours may result in incomplete reaction, whereas a reaction time substantially longer than 5 days does generally not affect reaction product but is undesirable for economic reasons.

The above described fabrication method results in formation of a layer of material that essentially consists of $NbSe_3$ and which generally can be easily removed from the substrate. Typically the powder layer is less than about 0.1 mm thick, and the process produces a fibrous $NbSe_3$ mat or sheet whose thickness (before and after rolling) is exemplarily about 0.4 and 0.12 mm, respectively. Thinner or thicker sheets can be readily produced. The thus produced $NbSe_3$ sheet can be used in the manufacture of a battery cell in conventional fashion.

The cell fabrication may be completed in a variety of ways well known in the battery art. Both large and small cells can be made with a variety of electrolytes and separator materials. Various shapes and cell structure are also useful. Particularly attractive are rolled cylindrical cells such as those described in U.S. Pat. No. 4,740,433 issued to W. P. Lu on Apr. 26, 1988 and U.S. Pat. No. 4,753,859 issued to L. E. Brand on June 28, 1988. These patents describe both separator material and electrolyte systems useful in the practice of the invention and are incorporated herein by reference.

Relevant parts of a useful rolled cylindrical cell 10 are shown schematically in the FIGURE. The cell comprises four layers rolled into a cylindrical shape. The four layers are a negative lithium electrode 11, a separator 12, a positive electrode 13, and a further separator layer 14. In a cell according to the invention the positive electrode is manufactured in accordance with the instant invention. The four-layer roll is generally put into a cylindrical container with suitable electrical connections to the positive and negative electrodes, respectively. The container is filled with an appropriate electrolyte to permit electrochemical action. These parts can be conventional and are not shown.

We claim:

1. A process of making a nonaqueous cell comprising a lithium negative electrode, a separator, a positive electrode comprising niobium chalcogenide active material, and electrolyte, the process characterized in that the positive electrode is made by a procedure that comprises the steps of
   a. forming a layer of niobium powder on a substrate; and
   b. reacting the niobium powder with selenium vapor or with sulfur vapor to form the niobium chalcogenide active material.

2. The process of claim 1 wherein the niobium chalcogenide is selected from the group consisting of $NbSe_3$ and $NbS_3$.

3. The process of claim 2 wherein forming the layer of niobium powder comprises depositing a liquid slurry comprising niobium powder on the substrate and removing the liquid from the deposited slurry.

4. The process of claim 3 wherein the liquid slurry is deposited by spraying and wherein the liquid is removed by a procedure that comprises heating of the substrate with the slurry thereon.

5. The process of claim 1 wherein the substrate comprises a material selected from the group consisting of alumina, quartz and aluminum.

6. The process of claim 5 wherein the substrate comprises alumina.

7. The process of claim 3 wherein the liquid in the slurry comprises propylene glycol.

8. The process of claim 1 wherein the niobium powder has particle size less than about mesh 325.

9. The process of claim 3 wherein the liquid slurry contains between 30 and 70 wt percent niobium.

10. The process of claim 1 wherein step (b) comprises heating the powder to a temperature in the range between 650° and 780° C. for at least two hours, and contacting the powder during at least part of this time with the selenium vapor.

11. The process of claim 10 wherein the temperature range is from 670° to 720° C.

12. The process of claim 1 wherein step (b) comprises heating in two stages; the first stage comprising heating the powder to a temperature between 520° and 625° C. for at least four hours, and the second stage comprising heating the powder to a temperature between 625° and 780° C. for at least two hours.

13. The process of claim 12 in which the temperature range for the first stage is from 570° to 610° C. and for the second stage from 650° and to 700° C., and wherein the first and second stages comprise heating for at least 12 hours and 10 hours, respectively.

14. A nonaqeuous cell comprising a lithium negative electrode, a separator, a positive electrode comprising niobium triselenide active material, electrolyte, and means for making electrical contact with the negative and the positive electrode, characterized in that the positive electrode is made by a procedure that comprises
  (a) forming a layer of niobium powder on a substrate; and
  (b) reacting the niobium powder with selenium vapor to form the niobium triselenide active material.

* * * * *